3,198,658
PROCESS FOR REPAIRING AN IMPERMEABLE
CARBON ARTICLE
Michiomi Kimura, Tokyo, and Takeo Nishikawa, Kanagawa-ken, Japan, assignors to Kabushiki Kaisha Musashinokagaku Kenkyujo, Tokyo, Japan, a corporation of Japan
No Drawing. Filed Feb. 2, 1962, Ser. No. 170,784
Claims priority, application Japan, May 24, 1961, 36/18,424
2 Claims. (Cl. 117—119.2)

The present invention relates to a process for the production of an impermeable carbon article. More particularly, this invention relates to a process whereby the pores of a permeable carbon article such as graphite or amorphous carbon are filled with triallylcyanurate and thereafter polymerized and cured.

It is a conventional art to fill the pores of a permeable carbon article with a synthetic resin to cure the same in order to impart impermeability thereto. At that occasion as the synthetic resin, both condensation type and polymerization type resins have been used. However, because the condensation type resin forms water and other substances depending on the respective resin upon being cured, it has a defect of incapable of completely filling the pores of the carbon article due to the decrease of the volume of the cured resin and another defect of destroying the carbon article when the water and other substances formed upon said condensation vaporize. In this connection, the polymerization type resin is free from such defects. However, polymerization type resins, for instance, polymers like diallylphthalate methacrylic ester etc. have other defect of softening at a comparatively low temperature and in case of polyester resin, it is difficult to impregnate the same in a permeable carbon article due to the relatively high viscosity of said resin, so the resin of this type has never been used in practical application.

An object of this invention is to improve such operational and qualitative defects and thereby to provide an impermeable carbon article having excellent heat stability and chemical resistance.

As a result of our various researches with reference to the synthetic resin capable of three dimensional polymerization having at least two vinyl radicals and whose monomer has low viscosity and can easily be impregnated in a carbon article, the present inventors have found that said object can be achieved by using triallylcyanurate (hereinafter referred to as TAC).

Originally, it is common for TAC to be used by copolymerization with polyester resin and the like for general purposes, whose homopolymer has been industrially useless. Because, the homopolymer of TAC is very brittle and apt to be cracked and smashed by even a slight force and it is hardly adherent to glass and metals.

Whereas, surprisingly enough, when it is used with a permeable carbon article as in the case of this invention, its brittleness is completely eliminated and a high mechanical strength surpassing that of the permeable carbon article itself is obtained as shall be mentioned later. It is perhaps because a mutually cooperative action by some cause will take place somehow or another between TAC and carbon.

The TAC used in this invention is a compound whose melting point being about 27° C. and having three functional radicals whose viscosity is only 10 cps. at a low temperature, for instance, 40° C., accordingly it can easily be impregnated and filled in the pores of a permeable carbon article. Furthermore, an impermeable carbon article which is a product obtained after having said TAC polymerized has excellent heat stability, extremely high hardness and good property hitherto entirely unknown.

As mentioned above, because TAC has extremely low viscosity, it can be easily impregnated in a permeable carbon article, on the other hand, it is likely to leak out during the polymerization thereof.

In this invention, for the purpose of preventing such trend, the permeable carbon article impregnated with TAC is subjected to a heat treatment, under atmospheric or elevated pressure, of at least 80° C. within a medium which can inhibit the effluence of TAC at the temperature of the primary polymerization of TAC (at least 80° C.).

As the medium mentioned above, ordinarily water or an aqueous solution of salts is used, however, unless effluenting TAC, an organic liquid can also be used. Also, the vapor flow of TAC of at least 30 mol percent can be used. As a polymerization catalyst, all free radical type catalysts, for instance, azobisbutylonitrile can be added to TAC, also these catalysts can be impregnated in the pores of the permeable carbon article before the impregnation of TAC in gaseous or liquid form. Also, a method may be taken by which TAC stabilized by a polymerization inhibitor is impregnated in the pores of the permeable carbon article having been added with those polymerization catalysts. When a polymerization catalyst is used, the time of said heat treatment necessary to complete the primary polymerization and elevate the viscosity of TAC is ordinarily 1–2 hours. When no polymerization catalyst is used, about twice as much time is necessary.

In such way, it is possible to obtain an impermeable carbon article by primarily polymerizing TAC of a carbon article to elevate the viscosity and thereafter curing without subjecting said article to a heat treatment. It is preferred, however, that said TAC be subjected to an after heat-treatment for several hours in accordance with various known methods following the primary polymerization thereof. By so doing, TAC, which is primarily polymerized within the pores of the carbon article, is cured and the impermeable carbon article thus prepared is of a superb quality.

Because the impermeable carbon article thus obtained is excellent in terms of heat stability, impermeability and chemical resistance, it has a broad usage as materials of construction for chemical industry such as reactor pipe, mechanical seal, bearing or their fittings, etc., which are used under such severe conditions; for example, at temperatures as high as 200–280° C.

For instance, the comparison between physical properties of the permeable carbon article molded into the shape of carbon mechanical seals and subjected to baking, and the physical properties of the carbon mechanical seals obtained by imparting impermeability thereto with TAC resin in accordance with the present invention is given in Table 1 below.

TABLE 1

| | Sample A | | Sample B | |
| --- | --- | --- | --- | --- |
| | Permeable carbon article | C.M.S. made impermeable with TAC resin | Permeable carbon article | C.M.S. made impermeable with TAC resin |
| Shore hardness | 71 | 95 | 43 | 67 |
| Apparent specific gravity | 1.60 | 1.74 | 1.73 | 1.88 |
| Anti-breaking-off strength (kg./cm.²) | 600 | 815 | 370 | 630 |
| Anti-pressure strength (kg./cm.²) | 1,620 | 2,900 | 870 | 1,400 |

Wherein C.M.S. stands for carbon mechanical seal.
Next, the results obtained by subjecting those samples to the anti-abrasion test were shown in the following Table 2. For information, said test was carried out by using Ohkoshi Rapid Abrasion Tester with water lubrication.

As the abrasion disc, stellite was used, while the circumferential velocity of the disc and the abrasion distance were respectively kept at 1.36 m./sec. and 200 m. of the impermeable carbon article made impermeable in accordance with this invention, and also the same of the impermeable carbon article made impermeable with hitherto used phenol resin is given in Table 3 below. In this connection, the resin impregnation ratio of the last two is about 20% by weight.

TABLE 3

|  | Permeable carbon article | Carbon article made impermeable with TAC resin | Carbon article made impermeable with phenol resin |
|---|---|---|---|
| Heat stability, ° C.: |  |  |  |
| In the air |  | 250 | 180 |
| In the nitrogen gas flow |  | 280 | 200 |
| Shore hardness | Amorphous carbon, 80 | 104 | 80 |
|  | Graphite, 35 | 62 | 50 |
| Anti-breaking-off strength (kg./cm²). | Amorphous carbon, 650 | 750 | 450 |
|  | Graphite, 300 | 550 | 400 |
| Apparent specific gravity | Amorphous carbon, 1.66 | 1.76 | 1.58 |
|  | Graphite, 1.66 | 1.85 | 1.80 |
| Chemical resistance |  |  | Carbon article made impermeable with TAC resin is superior to carbon article made impermeable with phenol resin in that it is strong against caustic alkali. |

TABLE 2

| Contact pressure (kg./cm.²) | Abrasion volume (mm.³) | | | |
|---|---|---|---|---|
|  | Sample A | | Sample B | |
|  | Permeable carbon article | C.M.S. made impermeable with TAC resin | Permeable carbon article | C.M.S. made impermeable with TAC resin |
| 60 | 0.01 |  |  |  |
| 100 | 0.03 | 0.004 | 0.004 |  |
| 120 | 0.045 | 0.01 | 0.006 | 0.002 |
| 150 | 0.08 | 0.02 | 0.01 | 0.002 |
| 200 |  | 0.028 | 0.02 | 0.003 |
| 230 |  |  | 0.025 | 0.005 |
| 300 |  |  |  | 0.012 |

Wherein C.M.S. stands for carbon mechanical seal.

The physical characteristic of those carbon mechanical seals made impermeable with TAC resin is not too different from that of carbon mechanical seals made impermeable with phenol resin at a low temperature. However, the carbon mechanical seal made impermeable with phenol resin degrades and its physical characteristic is destroyed at 180° C. or 200° C. at most, in contrast, the carbon mechanical seal made impermeable with TAC resin is charaerized in that it does not lose its physical characteristic as mentioned above at 260° C. or even 280° C. as the occasion may be.

The permeable carbon article consists essentially of graphite or amorphous carbon, and has numerous pores. The comparison between the physical properties of such a permeable carbon article as the above, and the same Hereinafter, explanations in more details will be made with reference to the following example.

*Example*

Three permeable graphite cuboids of a size, 30 mm. x 50 mm. x 50 mm. having different porosity were charged in a container which is capable of reducing and elevating the pressure. At first, the presure inside the container was reduced to 10 mm. Hg, then TAC was introduced thereinto, thereafter the pressure was elevated to 7 kg./cm.², as a result, TAC was very well impregnated in each shaped structure as shown in Table 4.

TABLE 4

| No. | Porosity of cuboid | Impregnation ratio |
|---|---|---|
| 1 | 11.2% | Volume percent, 8.45 (weight percent, 9.3). |
| 2 | 19.0% | Volume percent, 14.7 (weight percent, 16.2). |
| 3 | 24.3% | Volume percent, 18.3 (weight percent, 20.2). |

*Annotation.*—The porosity of permeable carbon articles is commonly 10–30%, of which about 80% are open pores and the remaining pores are closed.

As described above, TAC was impregnated to the graphite cuboids of the above given measurement with the porosity of 24.3%, and TAC was subjected to primary polymerization under various conditions, and by heat-treatment TAC was completely cured. The results obtained are given in Table 5.

TABLE 5

| No. | Primary polymerization | | | | After heat-treatment | |
|---|---|---|---|---|---|---|
|  | Amount of catalyst (percent) | Atmosphere | Heating Temperature (° C.) | Vaporizing ratio of TAC (percent) | Temperature (° C.) | Vaporizing ratio of TAC (percent) |
| 1 | 1.0 | Water | 100 | 1.6 | 200 | 4.1 |
| 2 | 0 | do | 100 | 4.7 | 200 | 7.3 |
| 3 | 1.0 | Aqueous solution of KCl. | 120 | 1.7 | 200 | 4.3 |
| 4 | 0 | do | 120 | 4.5 | 200 | 7.6 |
| 5 | 1.0 | TAC vapor | 120 | 1.0 | 200 | 4.1 |
| 6 | 0 | do | 120 | 4.7 | 200 | 8.0 |
| 7 | 1.0 | Fresh air | 120 | 7.2 | 200 | 9.5 |
| 8 | 0 | do | 120 | 8.2 | 200 | 12.0 |

*Annotation.*—In those experiments, the concentration of the aqueous solution of KCl was 40%, the partial pressure of the TAC vapor was 60 mol percent, as the catalyst, benzoyl peroxide solved in TAC in advance was used and the pressure was not elevated in the primary polymerization.

As will be seen from the above results, it is evident that the addition of the catalyst and the polymerization in the liquid or TAC vapor inhibited the vaporizing of TAC.

(1) PHYSICAL CHARACTERISTIC

The comparison of the physical properties between the permeable carbon articles untreated, and the impermeable carbon articles of the present invention obtained through the treatment carried out under the conditions provided by No. 5 of Table 5 above, is given in Table 6.

TABLE 6

| No. | Impregnation Characteristic | Permeable carbon articles | | | Impermeable carbon articles of this invention* | | |
|---|---|---|---|---|---|---|---|
| | | Shore hardness | Anti-breaking-off strength | Apparent specific gravity | Shore hardness | Anti-breaking-off strength | Apparent specific gravity |
| 1 | Material: Graphite (1) | 30 | 162 | 1.60 | 61 | 308 | 1.81 |
| 2 | Graphite (2) | 40 | 451 | 1.37 | 63 | 582 | 1.88 |
| 3 | Amorphous carbon (3) | 80 | 655 | 1.66 | 104 | 769 | 1.76 |

*All of them passed the air leakage test of 3 atm. and were impermeable.

(2) HEAT STABILITY

When the impermeable graphite of No. 1 of Table 6 was subjected to the thermobalance test in nitrogen gas flow at the temperature elevation of 100° C./hour, it suddenly began to decompose at about 308° C. As compared with the decomposition point (ca. 280° C.) of a TAC resin itself, it would be understood that in the case of graphite article made impermeable with TAC resin of this invention, the decomposition temperature raised to some extent. From the safety viewpoint, the heat stability of said article is considered about 270° C. In the case of a conventional carbon article made impermeable with the known resin, for instance, phenol resin, 180-200° C. is the limit. Thus, the carbon article made impermeable with TAC resin has a heat-stable temperature raised by as much as about 100° C.

(3) CHEMICAL RESISTANCE

A TAC resin singly is eroded by sulfuric acid and other oxidizing substance like a phenol resin and furan resin. However, a carbon article made impermeable with TAC resin displays chemical resistance superior to that of the carbon articles made impermeable with phenol resin and furan resin.

Having thus described the nature of the invention, what is claimed is:

1. A process for the preparation of an impermeable carbon article comprising the steps of impregnating the pores of a permeable carbon article selected from the group consisting of graphite and amorphous carbon with triallylcyanurate, polymerizing said triallylcyanurate, which is impregnated in the permeable carbon article, by heating said triallylcyanurate-impregnated permeable carbon article in a medium selected from the group consisting of water, an aqueous solution of potassium chloride and a vapor flow of triallylcyanurate of at least 30 mol percent, and thereafter heating said polymerized triallylcyanurate.

2. A process according to claim 1 wherein the triallylcyanurate is polymerized at a temperature of at least 80° C.

References Cited by the Examiner

UNITED STATES PATENTS 2,224,724  12/40  Elsey _____ 252—511
2,748,300   5/56  Moberly _____ 117—228 X

OTHER REFERENCES

"Polyester Resins," by Lawrence, pub. Reinhold Publishing Corp. (1960), pp. 26 and 29.

WILLIAM D. MARTIN, *Primary Examiner.*

RICHARD D. NEVIUS, *Examiner.*